(12) United States Patent
Ginsberg et al.

(10) Patent No.: US 10,549,954 B2
(45) Date of Patent: Feb. 4, 2020

(54) ELEVATOR SYSTEM HAVING LINEAR DRIVE

(71) Applicant: Otis Elevator Company, Farmington, CT (US)

(72) Inventors: David Ginsberg, Granby, CT (US); Fernando Rodriguez, Manchester, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 410 days.

(21) Appl. No.: 15/537,499

(22) PCT Filed: Dec. 22, 2015

(86) PCT No.: PCT/US2015/067263
§ 371 (c)(1),
(2) Date: Jun. 19, 2017

(87) PCT Pub. No.: WO2016/106275
PCT Pub. Date: Jun. 30, 2016

(65) Prior Publication Data
US 2017/0362062 A1    Dec. 21, 2017

Related U.S. Application Data

(60) Provisional application No. 62/095,950, filed on Dec. 23, 2014.

(51) Int. Cl.
*B66B 5/00* (2006.01)
*B66B 11/04* (2006.01)
(Continued)

(52) U.S. Cl.
CPC ........ *B66B 11/0407* (2013.01); *B66B 5/0031* (2013.01); *H02K 41/031* (2013.01); *B66B 9/003* (2013.01)

(58) Field of Classification Search
CPC ...... B66B 5/00; B66B 11/0407; B66B 5/0031
(Continued)

(56) References Cited

U.S. PATENT DOCUMENTS

| 3,806,783 A * | 4/1974 | Lodochnikov ......... H02K 29/12 |
| | | 318/400.41 |
| 5,141,082 A | 8/1992 | Ishii et al. |
| | | (Continued) |

FOREIGN PATENT DOCUMENTS

| CN | 101188393 | 5/2008 |
| WO | 2014113006 | 7/2014 |

OTHER PUBLICATIONS

International Application No. PCT/US2015/067263 International Search Report and Written Opinion, dated Jun. 2, 2016, 11 pages.
(Continued)

*Primary Examiner* — David S Warren
(74) *Attorney, Agent, or Firm* — Cantor Colburn LLP

(57) ABSTRACT

According to an aspect, an elevator system includes an elevator car 14 to travel in a hoistway 11 and a linear propulsion system 20 to impart force to the elevator car. The linear propulsion system includes a secondary portion 18 mounted to the elevator car and a primary portion 16 mounted in the hoistway. The primary portion includes a plurality of motor segments 26. The elevator system also includes a load sensor 52 operable to detect an elevator load on a brake. The elevator system further includes a control system 46 operable to apply an electrical current to at least one of the motor segments that overlaps the secondary portion, determine a measurement of the elevator load, and vary an electrical angle estimate while the brake is engaged and thrust is applied.

18 Claims, 4 Drawing Sheets

(51) Int. Cl.
*H02K 41/03* (2006.01)
*B66B 9/00* (2006.01)

(58) Field of Classification Search
USPC .......................................................... 187/289
See application file for complete search history.

(56) References Cited

U.S. PATENT DOCUMENTS

| | | | |
|---|---|---|---|
| 5,158,156 | A | 10/1992 | Okuma et al. |
| 5,547,059 | A | 8/1996 | Watanabe et al. |
| 6,242,822 | B1 * | 6/2001 | Strothmann ............ H02K 29/03 |
| | | | 310/12.19 |
| 7,019,421 | B1 | 3/2006 | Hall et al. |
| 9,318,984 | B2 * | 4/2016 | Yamanaka ............ H02K 41/031 |
| 9,712,032 | B2 * | 7/2017 | Aoyama ............... H02K 41/031 |
| 9,768,721 | B2 * | 9/2017 | Yamada ................ H02K 11/215 |
| 10,126,150 | B2 * | 11/2018 | Piippo ....................... H02P 6/15 |
| 2010/0171374 | A1 | 7/2010 | Sugita et al. |
| 2012/0193172 | A1 | 8/2012 | Matscheko et al. |
| 2014/0333236 | A1 * | 11/2014 | Yamanaka ............ H02K 41/031 |
| | | | 318/135 |
| 2015/0222167 | A1 * | 8/2015 | Aoyama .............. H02K 41/031 |
| | | | 310/12.18 |
| 2017/0054399 | A1 * | 2/2017 | Yamada ............... H02K 11/215 |
| 2017/0276519 | A1 * | 9/2017 | Piippo ....................... H02P 6/15 |
| 2017/0313552 | A1 * | 11/2017 | Hubbard ................... B66B 1/34 |
| 2017/0362062 | A1 * | 12/2017 | Ginsberg ................. B66B 9/02 |

OTHER PUBLICATIONS

CN Application No. 201580070821.5 First Office Action dated Sep. 18, 2018, 7 pages.

* cited by examiner

ELEVATOR SYSTEM HAVING LINEAR DRIVE

FIELD OF INVENTION

The subject matter disclosed herein relates generally to the field of elevators, and more particularly to using a load sensor for electrical angle and position measurements in an elevator system.

BACKGROUND

Self-propelled elevator systems, also referred to as ropeless elevator systems, are useful in certain applications (e.g., high rise buildings) where the mass of the ropes for a roped system is prohibitive and there is a desire for multiple elevator cars to travel in a single lane. There exist self-propelled elevator systems in which a first lane is designated for upward traveling elevator cars and a second lane is designated for downward traveling elevator cars under normal operating conditions. A transfer station at each end of the hoistway is used to move cars horizontally between the first lane and second lane. Additional lanes can also be supported.

One type of elevator propulsion system for ropeless elevator systems includes a linear motor, such as an electrically-controlled linear synchronous motor that uses at least one actively controlled winding. An accurate electrical angle determination is typically needed to efficiently operate a synchronous motor. Traditional elevator systems have relied upon rotary encoders or magnetic saliency of the motor to determine the electrical angle.

BRIEF DESCRIPTION OF THE INVENTION

According to one embodiment of the invention, an elevator system includes an elevator car to travel in a hoistway and a linear propulsion system to impart force to the elevator car. The linear propulsion system includes a secondary portion mounted to the elevator car and a primary portion mounted in the hoistway. The primary portion includes a plurality of motor segments. The elevator system also includes a load sensor operable to detect an elevator load on a brake. The elevator system further includes a control system operable to apply an electrical current to at least one of the motor segments that overlaps the secondary portion, determine a measurement of the elevator load, and vary an electrical angle estimate while the brake is engaged and thrust is applied.

In the above embodiments, or in the alternative, the electrical current can be applied to produce an upward thrust force to the elevator car.

In the above embodiments, or in the alternative, a peak thrust electrical angle for a control operation of the linear propulsion system can be determined by the control system based on identification of a value of the electrical angle estimate corresponding to a minimum load measurement of the elevator load while the brake is engaged.

In the above embodiments, or in the alternative, the peak thrust electrical angle can be determined upon initialization of the control system prior to disengagement of the brake.

In the above embodiments, or in the alternative, the peak thrust electrical angle can be applied to at least one of the motor segments by the control system after disengagement of the brake.

In the above embodiments, or in the alternative, the electrical current can be applied to one of the motor segments at a time while the brake is engaged.

In the above embodiments, or in the alternative, a peak thrust can be determined by the control system for each of the motor segments that overlaps the secondary portion based on the measurement of the elevator load while the brake is engaged.

In the above embodiments, or in the alternative, a position of the elevator car in the hoistway can be determined based on a predetermined position of the motor segments in the hoistway and a proportional distribution of the peak thrust observed among the motor segments that overlap the secondary portion.

In the above embodiments, or in the alternative, the secondary portion can include one or more permanent magnets, and the motor segments can each include one or more coils.

According to another embodiment of the invention, a method includes engaging a brake of an elevator car in a hoistway and applying an electrical current to a motor segment of a primary portion of a linear propulsion system that overlaps a secondary portion of the linear propulsion system to impart a force to the elevator car while the brake is engaged. The linear propulsion system includes the secondary portion mounted to the elevator car, and the primary portion includes a plurality of motor segments mounted in the hoistway. A measurement of the elevator load is determined while the brake is engaged. An electrical angle estimate is varied while the brake is engaged and thrust is applied.

In the above embodiments, or in the alternative, the electrical current can be applied to produce an upward thrust force to the elevator car.

In the above embodiments, or in the alternative, a peak thrust electrical angle for a control operation of the linear propulsion system can be determined based on identifying a value of the electrical angle estimate corresponding to a minimum load measurement of the elevator load while the brake is engaged.

In the above embodiments, or in the alternative, the peak thrust electrical angle can be determined upon control system initialization and prior to disengagement of the brake.

In the above embodiments, or in the alternative, the peak thrust electrical angle can be applied to at least one of the motor segments by the control system after disengagement of the brake.

In the above embodiments, or in the alternative, the electrical current can be applied to one of the motor segments at a time while the brake is engaged.

In the above embodiments, or in the alternative, a peak thrust for each of the motor segments that overlaps the secondary portion can be determined based on the measurement of the elevator load while the brake is engaged.

In the above embodiments, or in the alternative, a position of the elevator car in the hoistway can be determined based on a predetermined position of the motor segments in the hoistway and a proportional distribution of the peak thrust observed among the motor segments that overlap the secondary portion.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
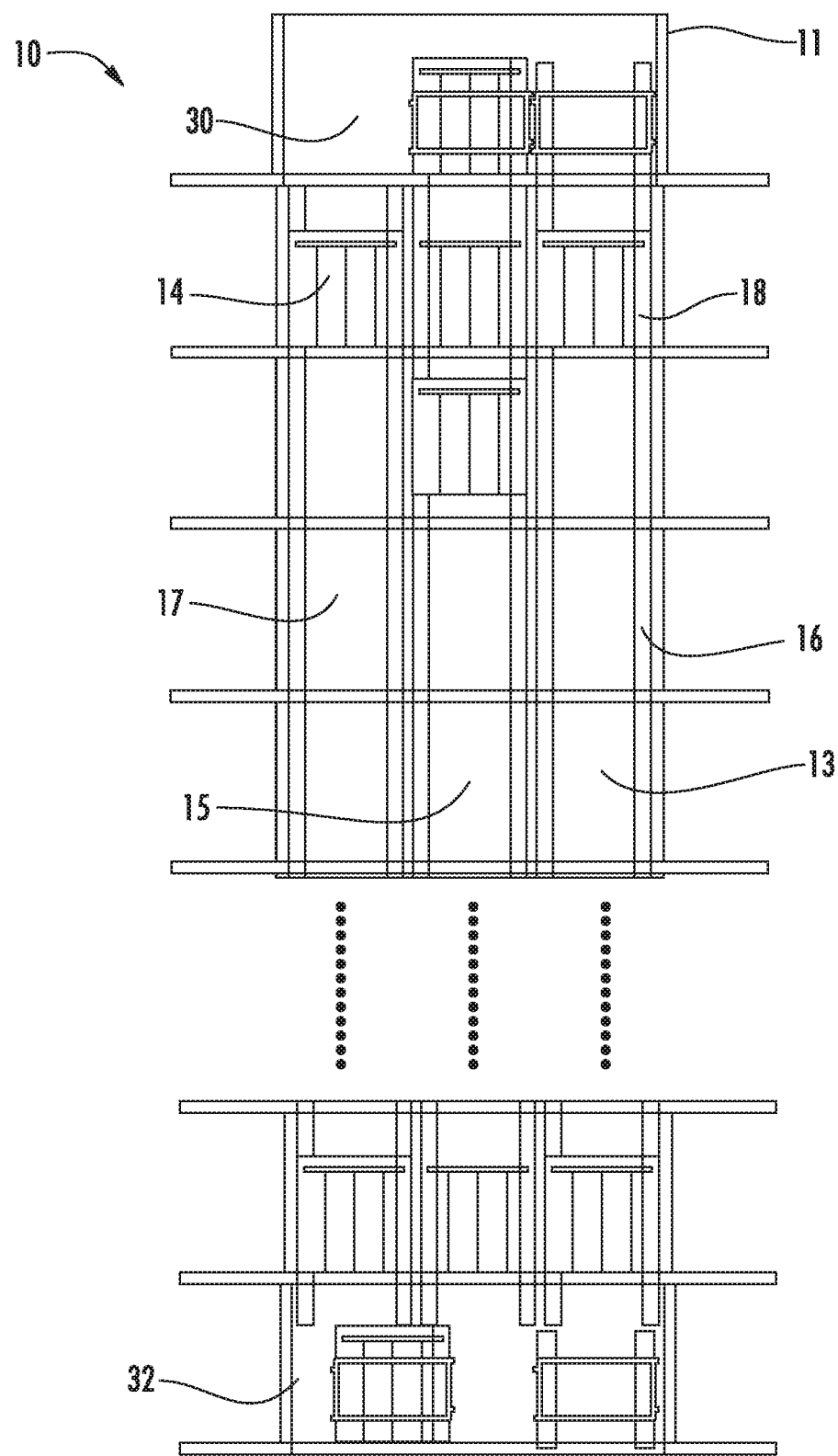
FIG. 1 depicts an multicar ropeless elevator system in accordance with an exemplary embodiment.

FIG. 1 depicts a multicar, self-propelled elevator system 10 in an exemplary embodiment. Elevator system 10 includes a hoistway 11 having a plurality of lanes 13, 15 and 17. While three lanes are shown in FIG. 1, it is understood that embodiments may be used with multicar, self-propelled elevator systems have any number of lanes. In each lane 13, 15, 17, cars 14 travel in one direction, i.e., up or down. For example, in FIG. 1 cars 14 in lanes 13 and 15 travel up and cars 14 in lane 17 travel down. One or more cars 14 may travel in a single lane 13, 15, and 17.

Above the top floor is an upper transfer station 30 to impart horizontal motion to elevator cars 14 to move elevator cars 14 between lanes 13, 15 and 17. It is understood that upper transfer station 30 may be located at the top floor, rather than above the top floor. Below the first floor is a lower transfer station 32 to impart horizontal motion to elevator cars 14 to move elevator cars 14 between lanes 13, 15 and 17. It is understood that lower transfer station 32 may be located at the first floor, rather than below the first floor. Although not shown in FIG. 1, one or more intermediate transfer stations may be used between the first floor and the top floor. Intermediate transfer stations are similar to the upper transfer station 30 and lower transfer station 32.

Cars 14 are propelled using a linear motor system having a primary, fixed portion 16 and a secondary, moving portion 18. The primary portion 16 includes windings or coils mounted at one or both sides of the lanes 13, 15 and 17. Secondary portion 18 includes permanent magnets mounted to one or both sides of cars 14. Primary portion 16 is supplied with drive signals to control movement of cars 14 in their respective lanes.

Figure 2:
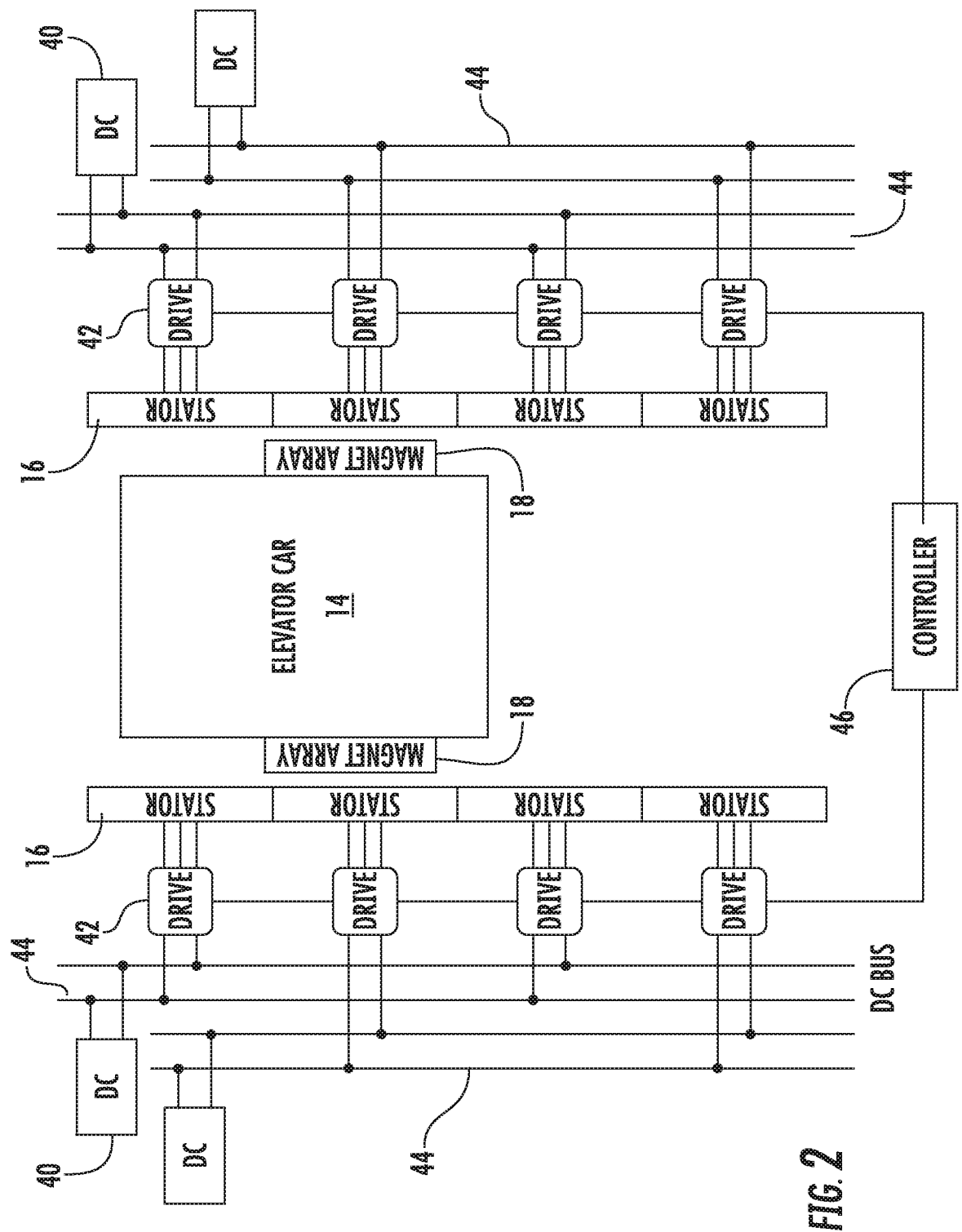
FIG. 2 depicts components of a drive system in an exemplary embodiment.

FIG. 2 depicts components of a drive system in an exemplary embodiment. It is understood that other components (e.g., safeties, brakes, etc.) are not shown in FIG. 2 for ease of illustration. As shown in FIG. 2, one or more DC power sources 40 are coupled to one or more drives 42 via one or more DC buses 44. DC power sources 40 may be implemented using storage devices (e.g., batteries, capacitors) or may be active devices that condition power from another source (e.g., rectifiers). Drives 42 receive DC power from the DC buses 44 and provide drive signals to the primary portion 16 of the linear motor system. Each drive 42 may be a converter that converts DC power from DC bus 44 to a multiphase (e.g., 3 phase) drive signal provided to a respective section of the primary portions 16. The primary portion 16 is divided into a plurality of motor sections, with each motor section associated with a respective drive 42.

A controller 46 provides control signals to the each of the drives 42 to control generation of the drive signals. Controller 46 may use pulse width modulation (PWM) control signals to control generation of the drive signals by drives 42. Controller 46 may be implemented using a processor-based device programmed to generate the control signals. Controller 46 may also be part of an elevator control system or elevator management system.

Figure 3:
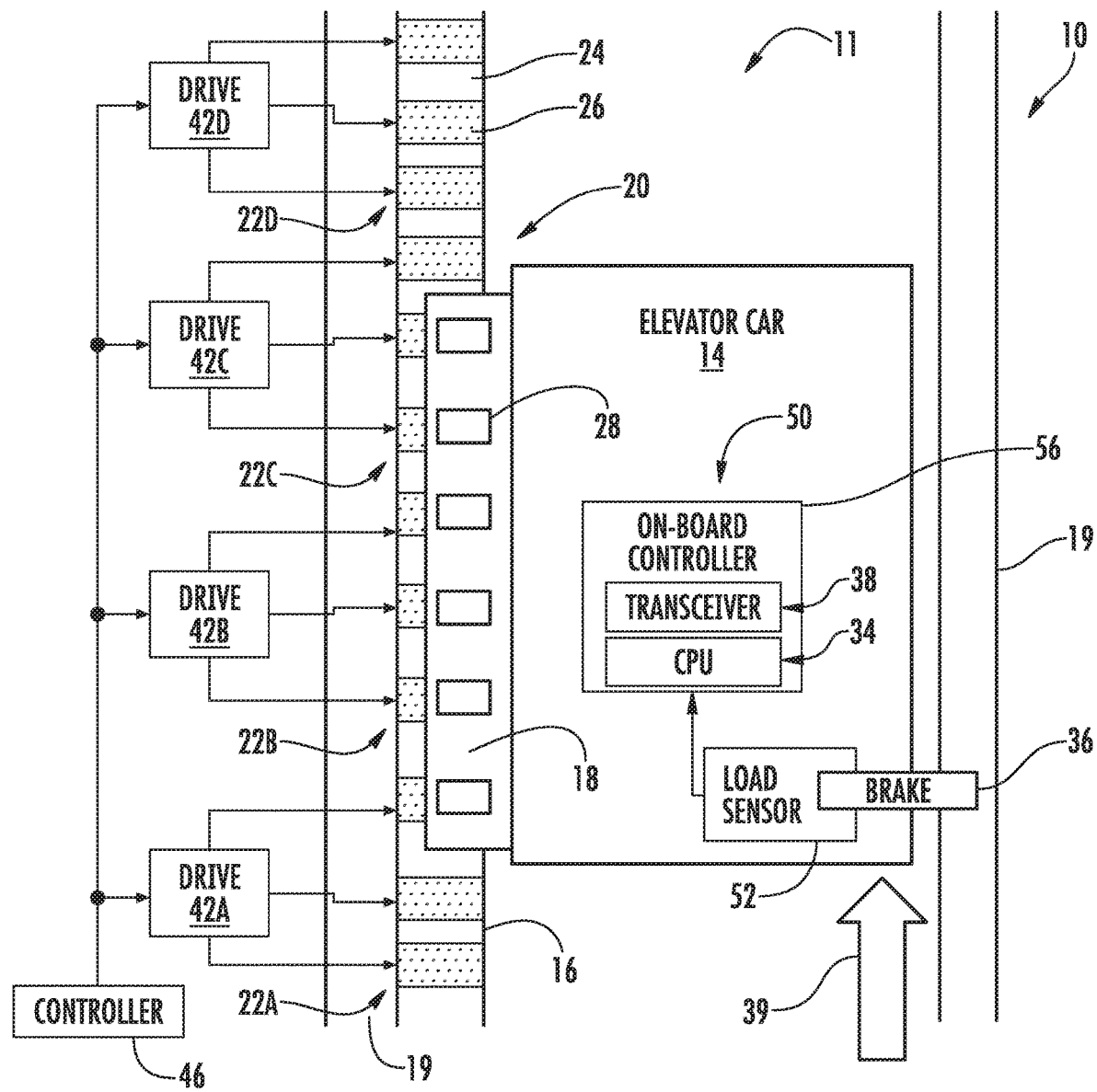
FIG. 3 depicts a portion of the elevator system in accordance with an exemplary embodiment.

FIG. 3 depicts another view of the elevator system 10 including an elevator car 14 that travels in hoistway 11. Elevator car 14 is guided by one or more guide rails 24 extending along the length of hoistway 11, where the guide rails 24 may be affixed to structural member 19. For ease of illustration, the view of FIG. 3 only depicts a single guide rail 24; however, there may be two or more guide rails 24 positioned, for example, on opposite sides of the elevator car 14. Elevator system 10 employs a linear propulsion system 20, where primary portion 16 includes multiple motor segments 22 each with one or more coils 26 (i.e., phase windings). Primary portion 16 may be mounted to guide rail 24, incorporated into the guide rail 24, or may be located apart from guide rail 24. Primary portion 16 serves as a stator of a permanent magnet synchronous linear motor to impart force to elevator car 14. Secondary portion 18 is mounted to the elevator car 14 and includes an array of one or more permanent magnets 28 as a second portion of the linear propulsion system 20. Coils 26 of motor segments 22 may be arranged in three phases, as is known in the electric motor art. One or more primary portions 16 may be mounted in the hoistway 11, to coact with permanent magnets 28 mounted to elevator car 14. The permanent magnets 28 may be positioned on two sides of elevator car 14; although, only a single side of elevator car 14 that includes permanent magnets 28 is depicted in the example of FIG. 3. Alternate embodiments may use a single primary portion 16—secondary portion 18 configuration, or multiple primary portion 16—secondary portion 18 configurations.

In the example of FIG. 3, there are four motor segments 22 depicted as motor segment 22A, motor segment 22B, motor segment 22C, and motor segment 22D. Each of the motor segments 22A-22D has a corresponding drive 42A-42D. Controller 46 provides drive signals to the motor segments 22A-22D via drives 42A-42D to control motion of the elevator car 14. Controller 46 may be implemented using a microprocessor executing a computer program stored on a storage medium to perform the operations described herein. Alternatively, controller 46 may be implemented in hardware (e.g., ASIC, FPGA) or in a combination of hardware/software. Controller 46 may also be part of an elevator control system. Controller 46 may include power circuitry (e.g., an inverter or drive) to power the primary portion 16. Although a single controller 46 is depicted, it will be understood by those of ordinary skill in the art that a plurality of controllers 46 may be used. For example, a single controller 46 may be provided to control the operation of a group of motor segments 22 over a relatively short distance.

In exemplary embodiments, the elevator car 14 includes an on-board controller 56 with one or more transceivers 38 and a processor, or CPU, 34. The on-board controller 56 and the controller 46 collectively form a control system 50 where computational processing may be shifted between the on-board controller 56 and the controller 46. In exemplary embodiments, the processor 34 is configured to monitor one or more sensors and to communicate with one or more controllers 46 via the transceivers 38. In exemplary embodiments, to ensure reliable communication, elevator car 14 may include at least two transceivers 38. The transceivers 38 can be set to operate at different frequencies, or communications channels, to minimize interference and to provide full duplex communication between the elevator car 14 and the one or more controllers 46. In the example of FIG. 3, the on-board controller 56 interfaces with a load sensor 52 to detect an elevator load on a brake 36. The brake 36 may engage with the structural member 19, a guide rail 24, or other structure in the hoistway 11. Although the example of FIG. 3 depicts only a single load sensor 52 and brake 36, elevator car 14 can include multiple load sensors 52 and brakes 36.

Elevator loads observed by the load sensor 52 can be computed locally by the on-board controller 56 or sent wirelessly to the controller 46 via transceiver 38 for further processing. As one example, the on-board controller 56 can stream data from the load sensor 52 in real-time as it is collected. Alternatively, the on-board controller 56 can time stamp or otherwise correlate elevator load data with timing information prior to sending the elevator load data to the controller 46.

One or more motor segments 22 can overlap the secondary portion 18 at any given point in time. In the example of FIG. 3, motor segment 22A partially overlaps the secondary portion 18 (e.g., about 33% overlap), motor segment 22B fully overlaps the secondary portion 18 (100% overlap), and motor segment 22C partially overlaps the secondary portion 18 (e.g., about 66% overlap). There is no depicted overlap between motor segment 22D and the secondary portion 18. In an embodiment, the control system 50 is operable to apply an electrical current to at least one of the motor segments 22 that overlaps the secondary portion 18 and determine a measurement of the elevator load while the brake 36 is engaged. Controller 46 can control the electrical current on one or more of the drives 42 while receiving elevator load data from the on-board controller 56 via transceiver 38 based on load sensor 52. The electrical current may be applied to produce an upward thrust force 39 to the elevator car 14 by injecting a constant current in reference to a direct-quadrature frame.

Figure 4:
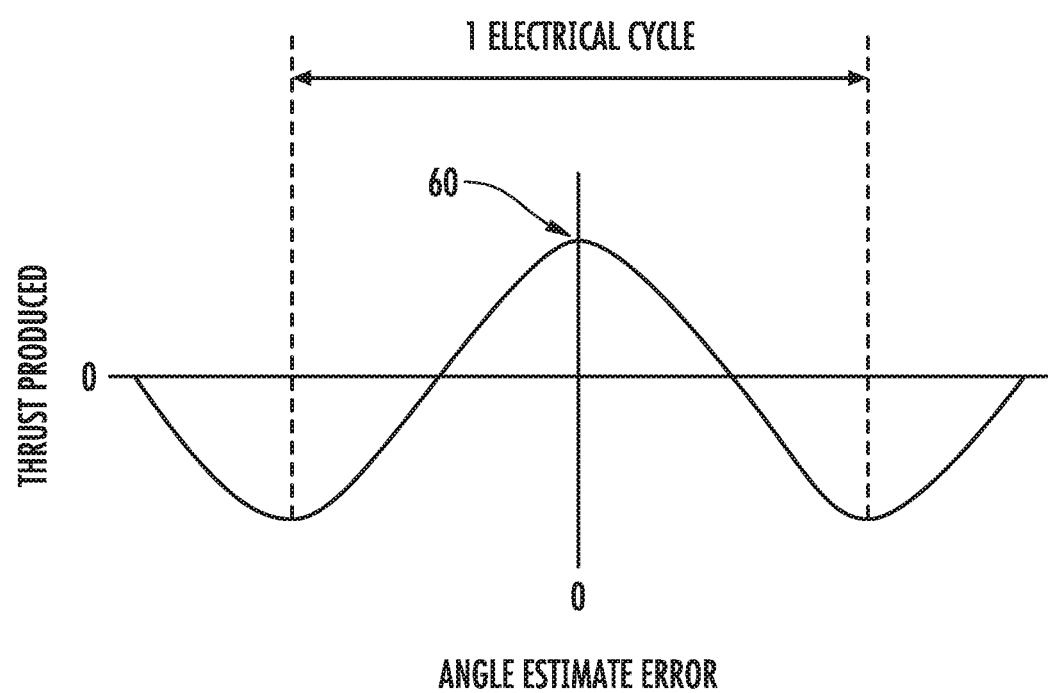
FIG. 4 is a diagram illustrating a relationship between an electrical angle estimation error and thrust produced in accordance with an exemplary embodiment.

The thrust produced by linear propulsion system 20 is dependent on the amount of overlap between the primary portion 16 with the secondary portion 18 and an estimate of the electrical angle of the linear propulsion system 20 made by the drive 42. The peak thrust is obtained when there is maximum overlap of the primary portion 16 with the secondary potion 18, and the estimate of the electrical angle has the minimum error. A thrust/angle-error curve follows the cosine function as depicted in FIG. 4, where a peak thrust 60 occurs at an angle estimate error of zero. The load sensor 52 is able to sense the elevator load between the elevator car 14 and the brake 36 in order to measure the thrust produced by any motor segment 22 on the elevator car 14.

An electrical angle estimate applied by a drive 42 can be varied with the brake 36 engaged while thrust is applied. As the electrical angle estimate changes, so does the generated thrust which is observed by the load sensor 52 as an elevator load. As the electrical angle estimate changes, the electrical current output from the drive 42 also changes (but may remain constant in a direct-quadrature frame of reference). The electrical angle estimate which results in the minimum load seen on the load sensor 52 can be used by the drive 42 for control of the linear propulsion system 20. A peak thrust electrical angle for a control operation of the linear propulsion system 20 may be determined by the control system 50 based on identification of a value of the electrical angle estimate corresponding to a minimum load measurement of an elevator load while the brake 36 is engaged. For example, the peak thrust can be determined by the control system 50 based on identification of a minimum load measurement of the elevator load while the brake 36 is engaged and an electrical angle estimate is varied.

The control system 50 can also determine a position of the elevator car 14 in the hoistway 11 based on a predetermined position of the motor segments 22 in the hoistway 11 and a proportional distribution of the peak thrust observed among the motor segments 22 that overlap the secondary portion 18, such as motor segments 22A-22C in the example of FIG. 3. Thrust can be produced with the brake 36 engaged in one motor segment 22 at a time overlapping the secondary portion 18 which results in a change detectable by the load sensor 52. The amount of thrust produced is proportional to the amount of overlap between the secondary portion 18 and each motor segment 22. The thrust produced is obtained from the load sensor 52 for each overlapping motor segment 22 (e.g., motor segments 22A-22C), and because the positions of the motor segments 22 of the primary portion 16 are fixed and known, a course position of the elevator car 14 in the hoistway 11 can be obtained. The drive 42 can inject a constant current to generate upward thrust force 39 and vary the electrical angle estimate while the brake is engaged. As the electrical angle estimate changes, so does the thrust amplitude and the angle at which peak thrust is generated corresponds to a fine position of the elevator car 14. The coarse position is refined by the fine position to give the precise position of the elevator car 14 in the hoistway 11. For example, if a position of the motor segment 22B is known and the motor segment 22B exhibits the largest peak thrust due to a complete overlap with the secondary portion 18, this information can define a coarse position. By comparing a peak thrust achievable using motor segments 22A and 22C upon varying the electrical angle estimate on drives 42A and 42C, a proportional amount of overlap can be determined to produce a fine position.

The automatic determination of electrical angle can enable control of the linear propulsion system 20 without the use of an absolute position sensor for initial electrical angle determination. The automatic position determination of the elevator car 14 in the hoistway 11 can eliminate the need for an absolute position sensor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. An elevator system comprising:
an elevator car to travel in a hoistway;
a linear propulsion system to impart force to the elevator car, the linear propulsion system comprising:
a secondary portion mounted to the elevator car; and
a primary portion mounted in the hoistway, the primary portion comprising a plurality of motor segments;
a load sensor operable to detect an elevator load on a brake; and
a control system operable to apply an electrical current to at least one of the motor segments that overlaps the secondary portion, determine a measurement of the elevator load, and vary an electrical angle estimate while the brake is engaged and thrust is applied.

2. The elevator system of claim 1, wherein a peak thrust electrical angle for a control operation of the linear propulsion system is determined by the control system based on identification of a value of the electrical angle estimate corresponding to a minimum load measurement of the elevator load while the brake is engaged.

3. The elevator system of claim 2, wherein the peak thrust electrical angle is determined upon initialization of the control system prior to disengagement of the brake.

4. The elevator system of claim 3, wherein the peak thrust electrical angle is applied to at least one of the motor segments by the control system after disengagement of the brake.

5. The elevator system of claim 1, wherein the electrical current is applied to one of the motor segments at a time while the brake is engaged.

6. The elevator system of claim 5, wherein a peak thrust is determined by the control system for each of the motor segments that overlaps the secondary portion based on the measurement of the elevator load while the brake is engaged.

7. The elevator system of claim 6, wherein a position of the elevator car in the hoistway is determined based on a predetermined position of the motor segments in the hoistway and a proportional distribution of the peak thrust observed among the motor segments that overlap the secondary portion.

8. The elevator system of claim 1, wherein the secondary portion comprises one or more permanent magnets.

9. The elevator system of claim 8, wherein the motor segments each comprise one or more coils to which the electrical current is applied.

10. A method comprising:
engaging a brake of an elevator car in a hoistway;
applying an electrical current to a motor segment of a primary portion of a linear propulsion system that overlaps a secondary portion of the linear propulsion system to impart a force to the elevator car while the brake is engaged, the linear propulsion system comprising the secondary portion mounted to the elevator car and the primary portion including a plurality of motor segments mounted in the hoistway;
determining a measurement of the elevator load while the brake is engaged; and
varying an electrical angle estimate while the brake is engaged and thrust is applied.

11. The method of claim 10, further comprising:
determining a peak thrust electrical angle for a control operation of the linear propulsion system based on identifying a value of the electrical angle estimate corresponding to a minimum load measurement of the elevator load while the brake is engaged.

12. The method of claim 11, wherein the peak thrust electrical angle is determined upon control system initialization and prior to disengagement of the brake.

13. The method of claim 12, wherein the peak thrust electrical angle is applied to at least one of the motor segments by the control system after disengagement of the brake.

14. The method of claim 10, wherein the electrical current is applied to one of the motor segments at a time while the brake is engaged.

15. The method of claim 14, further comprising:
determining a peak thrust for each of the motor segments that overlaps the secondary portion based on the measurement of the elevator load while the brake is engaged.

16. The method of claim 15, further comprising:
determining a position of the elevator car in the hoistway based on a predetermined position of the motor segments in the hoistway and a proportional distribution of the peak thrust observed among the motor segments that overlap the secondary portion.

17. The method of claim 10, wherein the secondary portion comprises one or more permanent magnets.

18. The method of claim 17, wherein the motor segments each comprise one or more coils to which the electrical current is applied.

* * * * *